United States Patent [19]
Kanota

[11] Patent Number: 5,233,478
[45] Date of Patent: Aug. 3, 1993

[54] APPARATUS FOR RECORDING A DIGITAL SIGNAL COMPOSED OF DIFFERENT TYPES OF DATA

[75] Inventor: Keiji Kanota, Kanagawa, Japan

[73] Assignee: Sony Corporation, Tokyo, Japan

[21] Appl. No.: 637,205

[22] Filed: Jan. 3, 1991

[30] Foreign Application Priority Data

Jan. 9, 1990 [JP] Japan .................................. 2-2384
Jul. 3, 1990 [JP] Japan ................................ 2-176070

[51] Int. Cl.$^5$ ................................................ G11B 5/02
[52] U.S. Cl. ..................................... 360/21; 360/19.1
[58] Field of Search ................... 360/18, 19.1, 21, 32, 360/64, 36.1, 36.2, 70

[56] References Cited

U.S. PATENT DOCUMENTS 4,630,132  12/1986  Terada et al. ....................... 358/310
5,072,316  12/1991  Kubota et al. ......................... 360/64

FOREIGN PATENT DOCUMENTS 0327188  8/1989  European Pat. Off. .
0344754  12/1989  European Pat. Off. .

OTHER PUBLICATIONS

Patent Abstracts of Japan vol. 10, No. 177 (P-470) Jun. 21, 1986 & JP-A-61 024 062 (Sanyo Electric Co. Ltd.).

*Primary Examiner*—Andrew L. Sniezek
*Assistant Examiner*—Won Tae C. Kim
*Attorney, Agent, or Firm*—Alvin Sinderbrand; William S. Frommer

[57] ABSTRACT

An apparatus for recording a digital signal composed of a plurality of different types of data. A plurality of rotary heads are coupled together to form a head unit, in which the heads are spaced from each other by predetermined distance in a track pitch direction and in a head scanning direction. A record device supplies the rotary heads with the digital signal for recording in adjacent tracks on a magnetic tape. The digital signal is supplied to the rotary heads in a timed manner such that the areas in adjacent tracks in which the same types of data are recorded are displaced from each other along the tracks by the predetermined distance in the head scanning direction.

6 Claims, 5 Drawing Sheets

APPARATUS FOR RECORDING A DIGITAL SIGNAL COMPOSED OF DIFFERENT TYPES OF DATA

BACKGROUND OF THE INVENTION

1. Field of the Invention

The present invention generally relates to digital signal recording and reproducing apparatus and, more particularly, to a digital signal recording and reproducing apparatus for use with a digital video tape recorder.

2. Description of the Prior Art

In a digital signal recording and reproducing apparatus according to the prior art, and a video signal is converted into a digital signal, and recorded in and reproduced from a tape by using a rotary head.

In such prior art digital signal recording and reproducing apparatus, the digital signal recorded and reproduced is generally divided into a plurality of digital signals which are supplied to respective signal channels and the digital signals from each channel are recorded and reproduced by respective independent heads. In this case, the plurality of heads which respectively correspond to the plurality of signal channels, are integrally formed as one body or unit so as to be mounted with relative ease on a head drum.

Recording signals are normally recorded at similar positions in each track on the tape to produce a recording format as, for example, shown in FIG. 1, thereby effectively utilizing the tape. As a result, in the head unit having the plurality of heads, a signal supplied to and recorded by a head in a succeeding position along the scanning direction (hereinafter, the succeeding head) is time delayed by an amount, corresponding to a distance between the succeeding head and the head having the preceding position in the scanning direction (hereinafter, the preceding head).

When the above-mentioned digital signal recording and reproducing apparatus is utilized in a video tape recorder (VTR), a video signal data and audio signal data are recorded in separate recording areas. In this case, respective, data signals must be independently recorded as, for example, by recording the audio signal in a so-called after-recording mode.

However, when using the above-described head unit it is at times very difficult to position one head in a recording mode so as to avoid crosstalk effects.

For example, as shown in FIG. 1, when the audio signal is recorded in the after-recording mode, the succeeding head still remains in the recording area of the video signal data when the preceding head reaches the starting portion of the recording area of the audio signal data. If the audio signal is recorded at this time, some amount of recording current is coupled to the succeeding head which, in turn, may negatively influence the video signal data. Therefore, the digital signal recording and reproducing apparatus according to the prior art cannot satisfactorily perform the after-recording of respective signals.

OBJECTS AND SUMMARY OF THE INVENTION

Accordingly, it is an object of the present invention to provide an improved digital signal recording and reproducing apparatus which can substantially eliminate the aforenoted shortcomings and disadvantage encountered with the prior art.

More specifically, it is an object of the present invention to provide a digital signal recording and reproducing apparatus in which an arbitrary recording signal can be recorded in a so-called after-recording mode without affecting other signals.

Another object of the present invention is to provide a digital signal recording and reproducing apparatus as aforementioned which effectively utilizes the recording surface on a recording tape.

It is yet a further object of the present invention to provide a digital signal recording and reproducing apparatus as aforementioned in which a digital signal can be recorded and reproduced satisfactorily.

It is still another object of the present invention to provide a digital signal recording and reproducing apparatus as aforementioned for use in a digital video tape recorder.

According to an aspect of the present invention, an apparatus for recording a digital signal composed of a plurality of different types of data is comprised of a plurality of rotary heads coupled together to form a head unit in which the heads are spaced from each other by predetermined distances in a track pitch direction and in a head scanning direction, respectively, and a record device for supplying the rotary heads with the digital signal for recording thereby in adjacent tracks on a magnetic tape scanned by the head unit the record device including a device for relatively timing the digital signal supplied to the heads so that areas of the adjacent tracks in which the same types of data are recorded are displaced from each other along the tracks by the predetermined distance in the head scanning direction.

The above, and other objects, features and advantages of the present invention will become apparent from the following detailed description of an illustrative embodiment when read in conjunction with the accompanying drawings in which corresponding parts are identified by the same reference numerals.

BRIEF DESCRIPTION OF THE DRAWINGS

FIGS. 5A–5E are timing charts used to explain an operation of the digital signal recording and reproducing apparatus of FIG. 2.

DETAILED DESCRIPTION OF THE PREFERRED EMBODIMENT

A digital signal recording and reproducing apparatus according to an embodiment of the present invention will now be hereinafter described with reference to the accompanying drawings.

Figure 1:
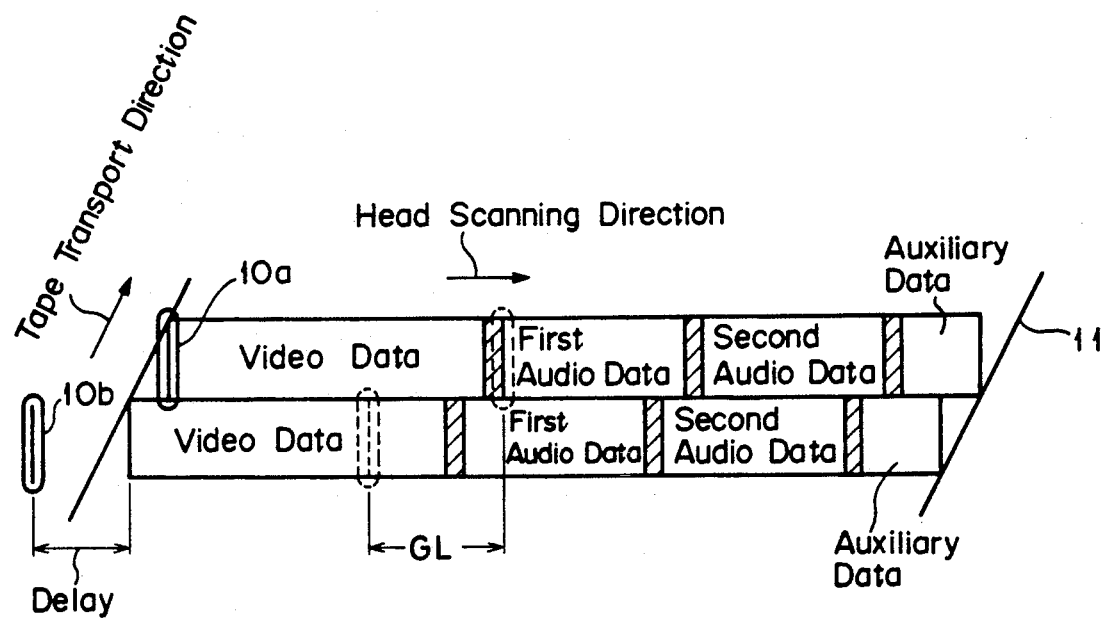
FIG. 1 is a diagram of a conventional format used for recording a digital signal.
Figure 2A:
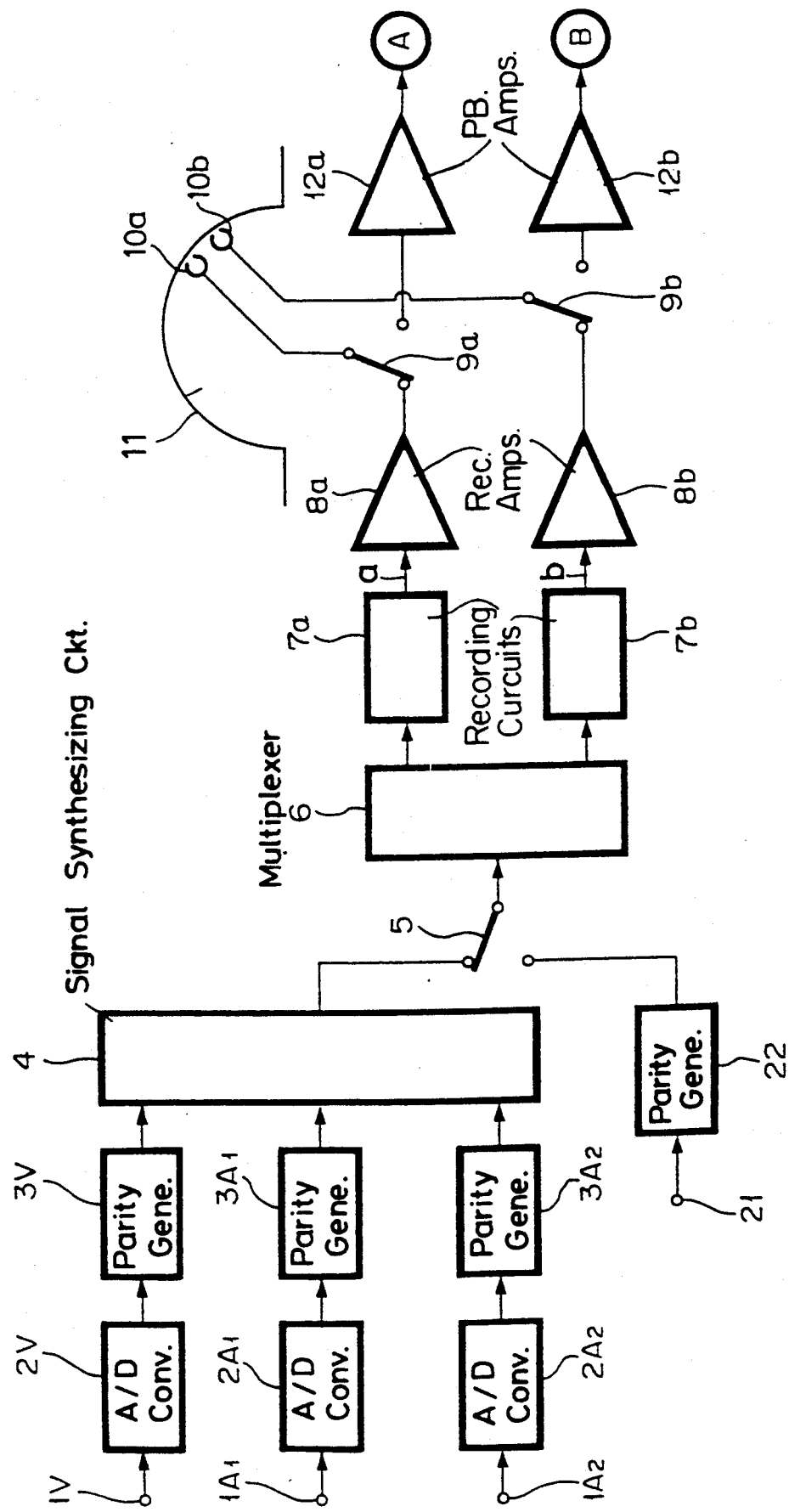
FIGS. 2A and 2B illustrate a block diagram of a digital signal recording and reproducing apparatus according to an embodiment of the present invention.
Figure 2B:
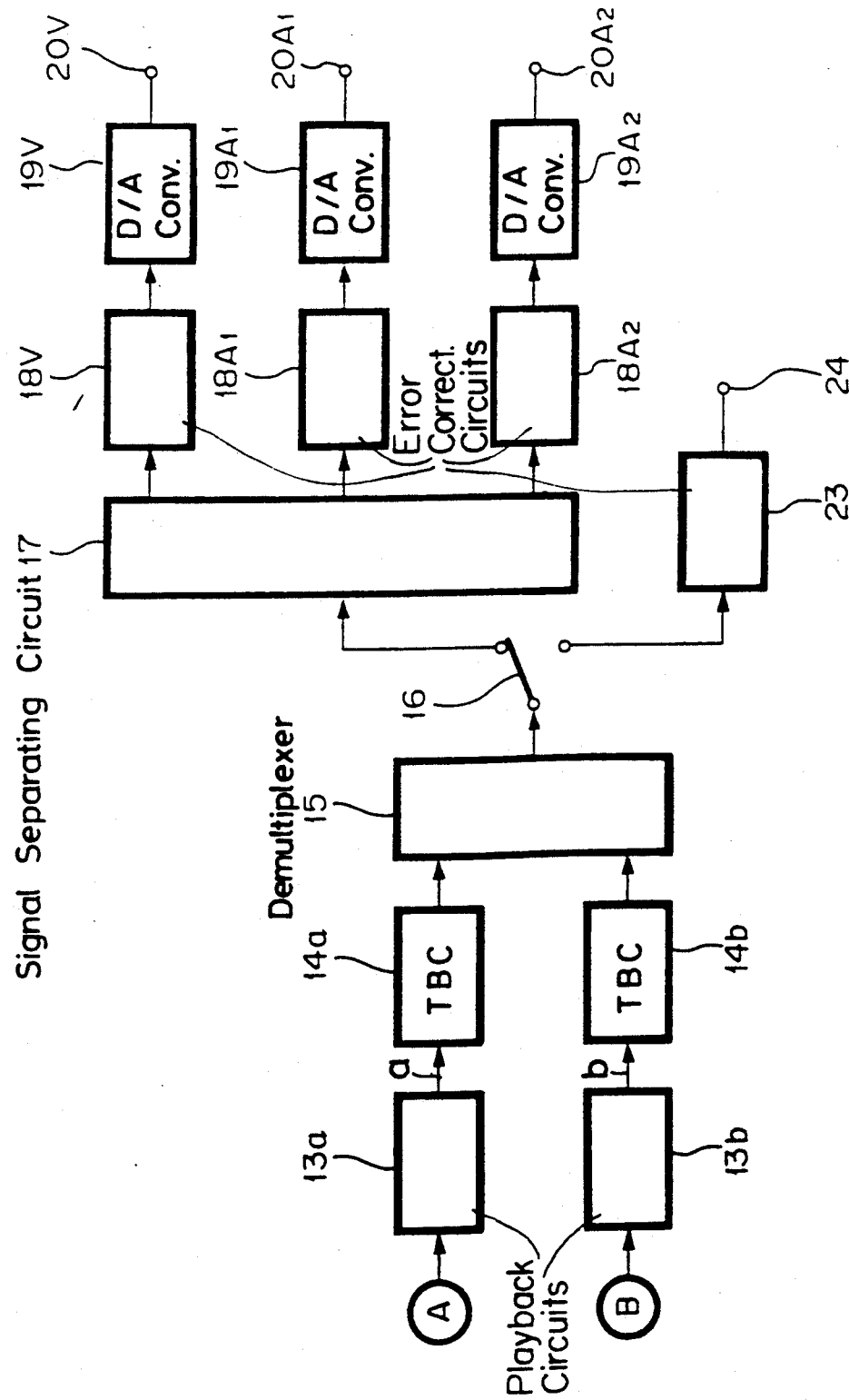

As shown in FIGS. 2A and 2B, a video signal, a first audio signal and a second audio signal are respectively supplied through input terminals 1V, 2A, and 1A$_2$ to analog-to-digital (A/D) converters 2V, 2A$_1$ and 2A$_2$, so as to be converted into respective digital signals. The converted digital signals from converters 2V, 2A, and 2A$_2$ are supplied to parity generating circuits 3V, 3A$_1$, and 3A$_2$, respectively, whereupon parity codes are added to the respective digital signals. The signals from circuits 3V, 3A, and 3A₂ are supplied to a signal synthesizing circuit 4, so as to be sequentially synthesized in a time-division manner thus providing a single main data signal. The synthesized signal from synthesizing circuit 4 is supplied through a switch 5 to a multiplexer 6.

In the multiplexer 6, the main data signal supplied thereto is separated into a plurality of channels of signals, for example, two channels. These separated signals are respectively supplied to recording circuits 7a and 7b, so as to be processed in a predetermined manner which, for example, may include a code conversion or the like, to provide recording signals a and b. Recording signals a and b are respectively supplied through recording amplifiers 8a and 8b and recording and reproduction change-over switches 9a and 9b to heads 10a and 10b, which form a rotary head, whereupon the signals are recorded on a tape 11.

As described above, the respective signals supplied to the input terminals 1V, 1A₁ and 1A₂ are converted into digital signals, for example, two channels of digital signals, and then recorded on the tape 11 by use of the heads 10a and 10b. On the other hand, the reproduction of these digital signals from tape 11 is performed as follows.

During reproduction, switches 9a and 9b are changed over so as to engage the respective contacts which are opposite to those shown engaged in FIG. 2A. The signals on the tape 11 are reproduced by the heads 10a and 10b and respectively supplied through switches 9a and 9b and reproducing amplifiers 12a and 12b to reproducing circuits 13a and 13b, in which the signals are processed in a predetermined manner so as to reverse the predetermined processing performed in the above-mentioned recording circuits 7a and 7b which, for example, may include a reverse code conversion, thus reconstructing the signals a and b. The reconstructed signals a and b are respectively supplied through timebase-compressing circuits 14a and 14b to a demultiplexer 15, in which the signals a and b are synthesized together to provide a single main data signal. This main data signal is supplied through a switch 16 to a signal separating circuit 17, in which the signal is separated into a video signal and first and second audio signals, which signals are substantially similar to the signals supplied to synthesizing circuit 4. The separated signals are respectively supplied to error correcting circuits 18V, 18A₁ and 18A₂, in which error corrections are performed by utilizing the added parity codes. The error-corrected digital signals are respectively supplied through digital-to-analog (D/A) converters 19V, 19A₁ and 19A₂, in which the signals are converted into analog signals, to output terminals 20V, 20A₁ and 20A₂.

Thus, as previous described, the digital signals reproduced from the tape by the heads 10a and 10b are converted into analog signals and respectively supplied to output terminals 20V, 20A₁ and 20A₂.

Figure 3:
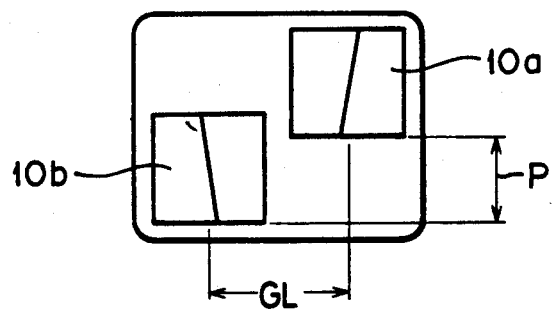
FIG. 3 is a diagram of a head arrangement used in the apparatus of FIG. 2.

In a preferred embodiment of the present invention, the heads 10a and 10b are integrally formed as one body and arranged as shown in FIG. 3. More specifically, the heads 10a and 10b are separated in one direction by a level difference P, which corresponds to the track pitch, and in the head scanning direction by a predetermined difference GL so as to substantially avoid crosstalk or the like from occurring between the heads. Further, when the head unit formed of the heads 10a and 10b is rotated and the tape 11 is transported along the rotating circumferential surface of the head unit, the recorded pattern on the tape 11 is as shown in FIG. 4.

Figure 4:
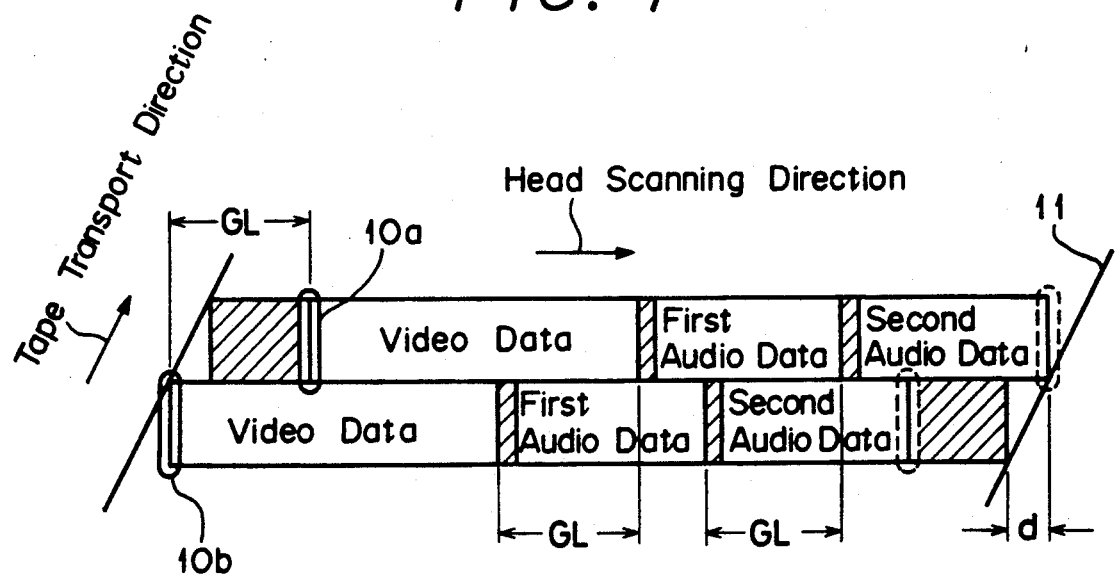
FIG. 4 is a diagram of a format used for recording a digital signal utilized by the apparatus of FIG. 2.

As is to be appreciated from the recorded pattern shown in FIG. 4, since the respective signals are recorded on the tape 11 such that areas in adjacent tracks which have similar types of data signals are displaced from each other along the scanning direction by the distance GL, when the heads 10a and 10b scan the tape 11 they reach the recording areas of the similar data signals simultaneously. Accordingly, selected signals can be recorded using the after-recording mode or the like without affecting other signals.

More specifically, the signals to be processed using the after-recording mode or the like are respectively supplied to the input terminals 1V, 1A₁ and 1A₂ and the recording apparatus is placed in the recording mode only during the time in which the signals are recorded in the respective recording area, whereby the signals can be recorded without affecting other signals.

Further, in the recording pattern shown in FIG. 4, the track formed by the head 10a includes a starting end portion as shown by the hatched area. As a result, when the head 10a is brought in contact with the tape 11, the head 10b is not yet in contact with the tape 11. On the other hand, the track formed by the head 10b includes an ending portion as shown by the hatched area. Thus, when the head 10b is brought in contact With the ending portion of tape 11, the head 10a is always removed from the tape 11. Accordingly, with respect to these hatched areas shown in FIG. 4, even when the heads 10a and 10b are placed in the recording mode, only the tracks corresponding to the respective heads are affected.

An auxiliary data signal is supplied through an input terminal 21, as shown in FIG. 2A, to a parity generating circuit 22, in which the auxiliary data signal is added with a parity code which, in turn, is used in performing error correction as hereinafter described. The output signal from circuit 22 is supplied through the switch 5 to the multiplexer 6 and is thereafter recorded onto tape 11 as described below. During reproduction, the reproduced signal from demultiplexer 15 is supplied through switch 16 to an error correction circuit 23, in which the signal is error-corrected by using the above-mentioned added parity code. The error-corrected auxiliary data signal from circuit 23 is supplied to an output terminal 24.

In the recording mode, the signal synthesizing circuit 4 and the parity generating circuit 22 derive a main data signal added with the parity code and an auxiliary data signal as, for example, shown in FIGS. 5A and 5B, respectively. These main and auxiliary signals are alternatively selected by the switch 5 and fed to the multiplexer 6. In the multiplexer 6, the signal supplied thereto is divided into two channels of signals, as shown in FIGS. 5C and 5D, and supplied to the heads 10a and 10b, respectively. Thus, the signal including the auxiliary signal, which is inserted into the hatched areas, is recorded. In the rewriting mode of the auxiliary data signal, the digital signal recording apparatus is switched to the recording mode only in the time periods shown in the timing chart of FIG. 5E, whereby the auxiliary data signal can be rewritten in these respective areas without affecting other signals. As is to be appreciated, by performing the inverse operations to those used during the recording mode, the main data signal and the auxiliary data signal can be reproduced.

Therefore, according to the present apparatus, since the signals are recorded in adjacent tracks with a delay time corresponding to the predetermined difference GL in the scanning direction, the respective heads simultaneously reach the recording areas of the respective signals so that the respective signals can be recorded in the after-recording mode or the like without affecting other signals. Further, the recording area of the auxiliary data signal is approximately the area in a track having a length corresponding to the difference GL in the scanning direction of the head from the end portion of the track. As a result, the recording area of the tape is effectively utilized and a digital signal can be satisfactorily recorded thereto and/or reproduced therefrom.

In the present apparatus, the length of the predetermined difference GL is generally about 1 to 2 mm and the amount of auxiliary data, which can be recorded in this area, is approximately 4 to 8 kilobits. Further, in actual practice, the length of the above-mentioned hatched area is equal to:

$$GL - d$$

where d is the amount in which the track position is shifted due to the inclination of the tape (track), or the offset. In a preferred embodiment, the value of the offset d is very small, for example, a fraction of the length GL. Further the auxiliary data signal may be recorded on any one of the tracks.

Although, the above-mentioned embodiment of the present apparatus utilized two heads were coupled to form a single body, the present apparatus is not so limited and can utilize a greater number of heads which can be coupled to form a single body. In addition, different types of data, such as, video data, audio data, sub data and so on, can be recorded in the auxiliary data recording area.

Although a preferred embodiment of the present invention and various modifications have been described in detail herein with reference to the accompanying drawings, it is to be understood that this invention is not limited to the specifically described embodiment and modifications and that other modifications and variations could be effected therein by one skilled in the art without departing from the spirit or scope of the invention as defined in the appended claims.

I claim as my invention:

1. An apparatus for recording a digital signal composed of a plurality of different types of data, said apparatus comprising:
    a plurality of rotary head coupled together to form a head unit in which said heads are spaced from each other by predetermined distances in a track pitch direction and in a head scanning direction, respectively, for scanning adjacent tracks on a magnetic tape scanned by said head unit; and
    record means for supplying said digital signal to said rotary heads so as to record each of said types of data in a respective overdetermined area in each of said adjacent tracks on the magnetic tape scanned by said head unit, said record means including means for relatively timing said digital signal supplied to said heads so that the respective predetermined area for each of the types of data in each of the tracks is displaced from the predetermined area for the same type of data in the tracks adjacent thereto by said predetermined distance in the head scanning direction.

2. An apparatus according to claim 1, wherein said predetermined distance in the head scanning direction is the distance between gaps of said plurality of heads which are adjacent each other in said head unit.

3. An apparatus according to claim 2, wherein said plurality of types of data in said digital signal are video data and audio data.

4. An apparatus according to claim 2, wherein there are two of said rotary heads and the azimuth angles of said rotary heads are different from each other.

5. An apparatus according to claim 4, further comprising supply means for supplying an auxiliary signal to said two heads, said supply means including means for timing said auxiliary signal supplied to said two heads so as to be recorded in a starting portion of each track formed by the one of said two heads in a preceding position in said unit and in an ending portion of each track formed by the one of said two heads in a succeeding position.

6. An apparatus according to claim 5, wherein the length of each of said starting and ending portions where the auxiliary signal is recorded is equal to $GL - d$, where GL is the distance between said gaps of the adjacent heads and d is the offset between the starting ends of the two adjacent recorded tracks in the head scanning direction.

* * * * *